United States Patent
Bryant et al.

(10) Patent No.: US 10,261,874 B2
(45) Date of Patent: Apr. 16, 2019

(54) ENABLING A CLOUD CONTROLLER TO COMMUNICATE WITH POWER SYSTEMS

(71) Applicant: International Business Machines Corporation, Armonk, NY (US)

(72) Inventors: Jay S. Bryant, Rochester, MN (US); James E. Carey, Rochester, MN (US); Zachary A. Hill, Muskegon, MI (US); Kendall J. Nelson, St. Paul, MN (US); Lucas A. Palm, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 15/366,669

(22) Filed: Dec. 1, 2016

(65) Prior Publication Data

US 2018/0157563 A1 Jun. 7, 2018

(51) Int. Cl.
| | | |
|---|---|---|
| *G06F 11/00* | (2006.01) | |
| *G06F 11/20* | (2006.01) | |
| *G06F 11/30* | (2006.01) | |
| *G06F 11/34* | (2006.01) | |

(52) U.S. Cl.
CPC ........ *G06F 11/203* (2013.01); *G06F 11/3006* (2013.01); *G06F 11/3058* (2013.01); *G06F 11/3452* (2013.01); *G06F 11/3495* (2013.01)

(58) Field of Classification Search
CPC .............. G06F 11/203; G06F 11/3006; G06F 11/3058; G06F 11/3452; G06F 11/3495; G06F 11/0709
See application file for complete search history.

(56) References Cited

U.S. PATENT DOCUMENTS

| | | | |
|---|---|---|---|
| 8,055,933 B2 | 11/2011 | Jaehde et al. | |
| 8,341,626 B1* | 12/2012 | Gardner | G06F 9/4856 718/1 |
| 2010/0211669 A1 | 8/2010 | Dalgas et al. | |
| 2010/0211810 A1 | 8/2010 | Zacho | |
| 2012/0310765 A1 | 12/2012 | Masters | |
| 2013/0262390 A1* | 10/2013 | Kumarasamy | H04L 41/0846 707/649 |
| 2014/0201482 A1* | 7/2014 | Dudgeon | G06F 3/0647 711/162 |
| 2015/0088586 A1* | 3/2015 | Pavlas | G06F 9/45558 705/7.25 |
| 2015/0234719 A1* | 8/2015 | Coronado | G06F 11/203 714/6.3 |
| 2016/0034362 A1* | 2/2016 | Al-Wahabi | G06F 11/203 714/4.1 |
| 2016/0344821 A1* | 11/2016 | Khosrowpour | H04L 67/148 |

* cited by examiner

*Primary Examiner* — Joseph D Manoskey
(74) *Attorney, Agent, or Firm* — VanLeeuwen & VanLeeuwen; David B. Woycechowsky

(57) ABSTRACT

An approach is disclosed that receives power related data from one or more power systems. The approach then determines, based on an analysis of the power related data, an anticipated power outage, with the power outage includes a power outage time estimate. The approach further identifies jobs to be migrated from a primary data center to a remote data center. The identification of the jobs to be migrated is based, at least in part, on the power outage time estimate.

20 Claims, 7 Drawing Sheets

ENABLING A CLOUD CONTROLLER TO COMMUNICATE WITH POWER SYSTEMS

BACKGROUND

Disasters, including natural disasters like hurricane, tornadoes, earthquakes and floods, and other types of disasters, such as civil unrest in certain areas of the world, have become a more frequent variable in the availability of data centers. Other events besides disasters also cause power emergencies, such as brown outs or power outages, depending on power available to a particular energy grid. With power outages becoming more frequent, Uninterruptible Power Systems (UPS) and backup power generators have become much more sophisticated. Such systems and generators are often able to calculate how long they can run on the available battery supply or fuel resources. These UPS devices and generators have also become more connected, being able to communicate this information via secure network connections. The problem, however, is that the information provided by these devices and systems is not being utilized by data centers. Traditional data centers typically operate manual processes performed by administrators to decide how to proceed. More specifically, human administrators decide which scheduled computing jobs to migrate of the data center(s) to be affected by an anticipated power outage. These migration decisions are typically based upon human analysis of data received through computer networks, such as the internet.

SUMMARY

An approach is disclosed that receives power related data from one or more power systems. The approach then determines, based on an analysis of the power related data, an anticipated power outage, with the power outage includes a power outage time estimate. The approach further identifies jobs to be migrated from a primary data center to a remote data center. The identification of the jobs to be migrated is based, at least in part, on the power outage time estimate.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

According to an aspect of the present invention, there is a method, information handling system and/or computer program product for performing the following actions (not necessarily in the following order): (i) receiving one or more sets of power related data relating to information potentially relevant to operation of one or more power systems; (ii) applying, by a set of processor(s), a set of machine logic based rules to the sets of power related data, to determine an anticipated power outage data set including information indicative an anticipated start time and anticipated location for an anticipated power outage; and (iii) identifying a first computing job to be migrated from a first data center to a second data center, wherein the identification of the first computing job is based, at least in part, on the anticipated power outage data set.

BRIEF DESCRIPTION OF THE DRAWINGS

This disclosure may be better understood by referencing the accompanying drawings, wherein.

DETAILED DESCRIPTION

Figure 1:
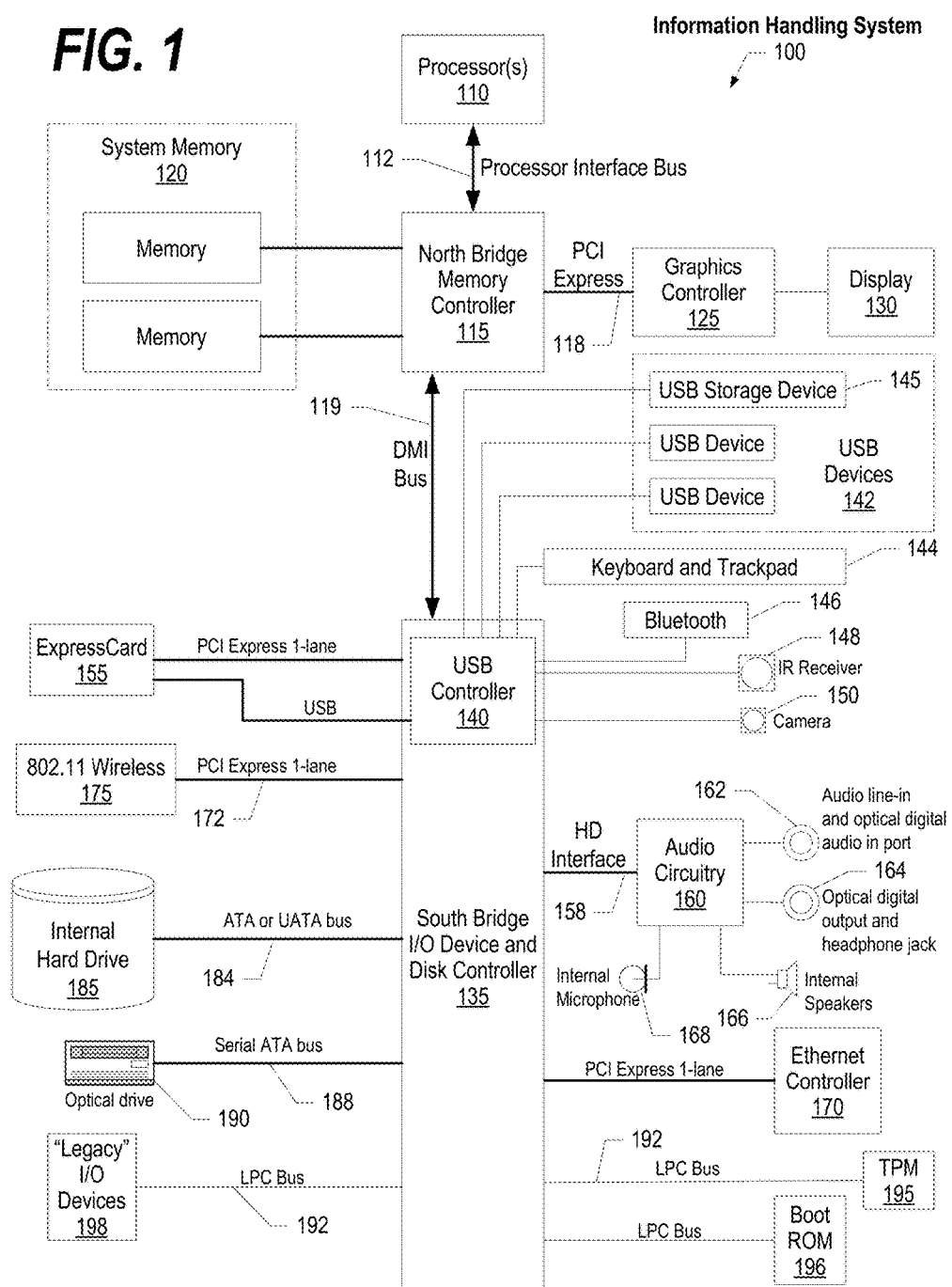
FIG. 1 is a block diagram of a data processing system in which the methods described herein can be implemented.

FIGS. 1-7 shows an approach that bridges the gap between the emergency power systems and clouds running in data centers. The approach provides a correlation between the data center disaster recovery application, the emergency power systems, and the cloud manager. This is provided by utilizing historic information about: emergency power system availability, virtual machine life expectancy based on application type, etc. In addition, the approach uses analytics to determine which applications are most critical based on usage, application type, etc. and supports an administrator provided specification of priorities. The approach correlates with emergency power systems or disaster recovery applications for target systems for virtual machine migration and for support systems, such as switches.

The approach provides the ability for the emergency power systems to analyze the amount of battery or fuel remaining to calculate the available runtime for the cloud based on the current load. This data is communicated to the cloud's management system. The management system then uses historical data and analytics to determine the amount of time required to evacuate the cloud to a different data center. This allows the cloud to automatically start making decision about how to handle the disaster underway. The fact that the data center can do this automatically is particularly advantageous for large natural disasters where the system administrator may not be able to reach the data center or even connect to the center in question, as the approach is able to start handling the situation autonomously.

The cloud management system determines the bandwidth between two data centers, calculate the amount of data that would need to be moved to migrate the cloud to the new data center and how long the data is likely to take to be moved. The system then takes action automatically to make such moves so they will complete before the total power outage occurs. Additionally, information about the connections between the source data center and the destination could be taken into account. For example, if the source data center has 12 hours of runtime but the location running the switches between the source and destination only has 8 hours of runtime, then migrations would need to be started earlier. Also, in such an example, it could be determined that the destination data center has also been impacted and only has 8 hours of runtime while the source has 12, then the approach might determine that it is not advantageous to start migrating.

Additionally, administrators can establish rules for different work loads, indicating in emergency situations the highest priority workloads for migration. These rules are taken into account when planning evacuation of the data center. Enabling the cloud controller to communicate with its power systems and analyze the available data enables better disaster recovery and avoidance technologies so that jobs run on a data center, such as cloud applications, better avoid outages due to power outages.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
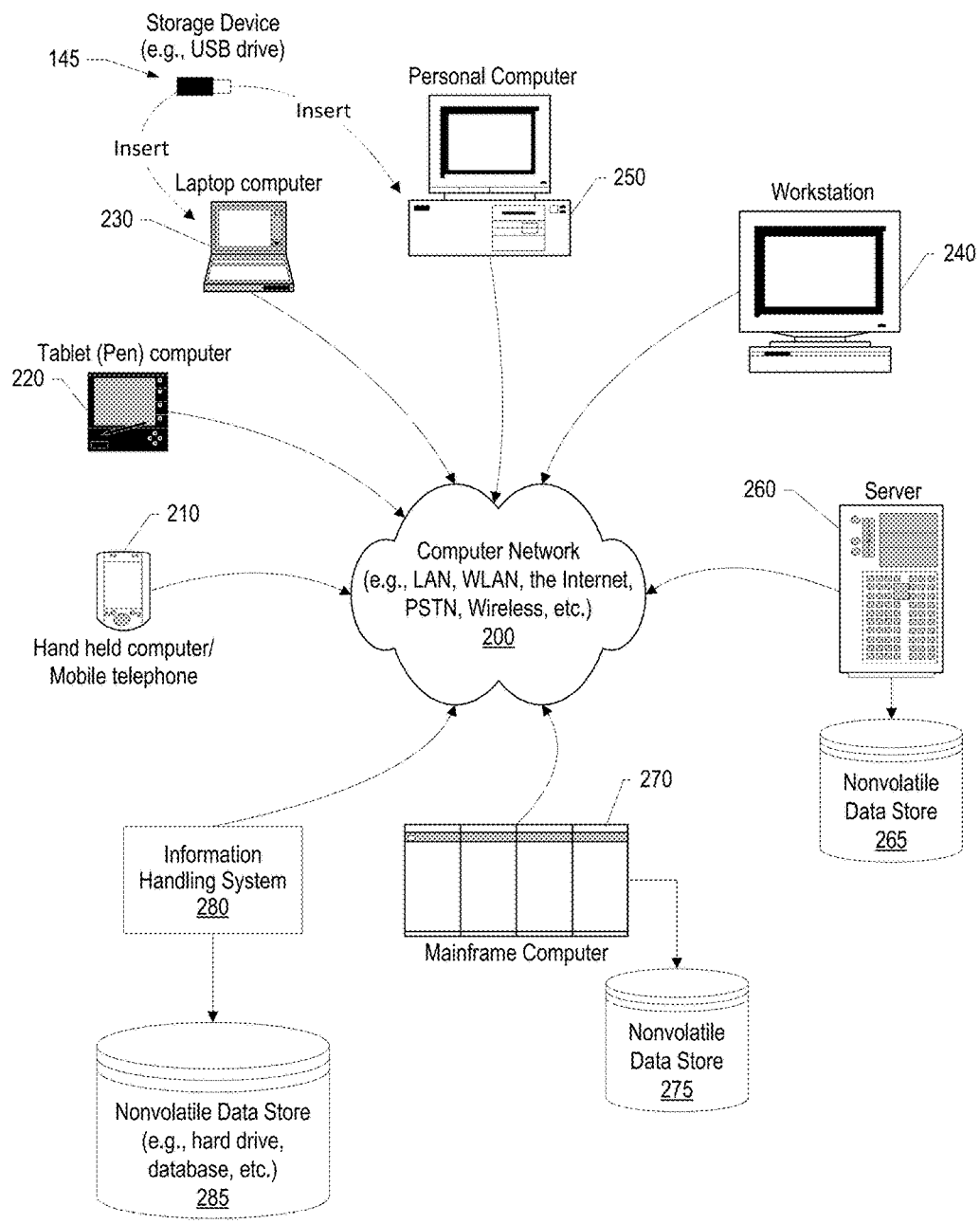
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
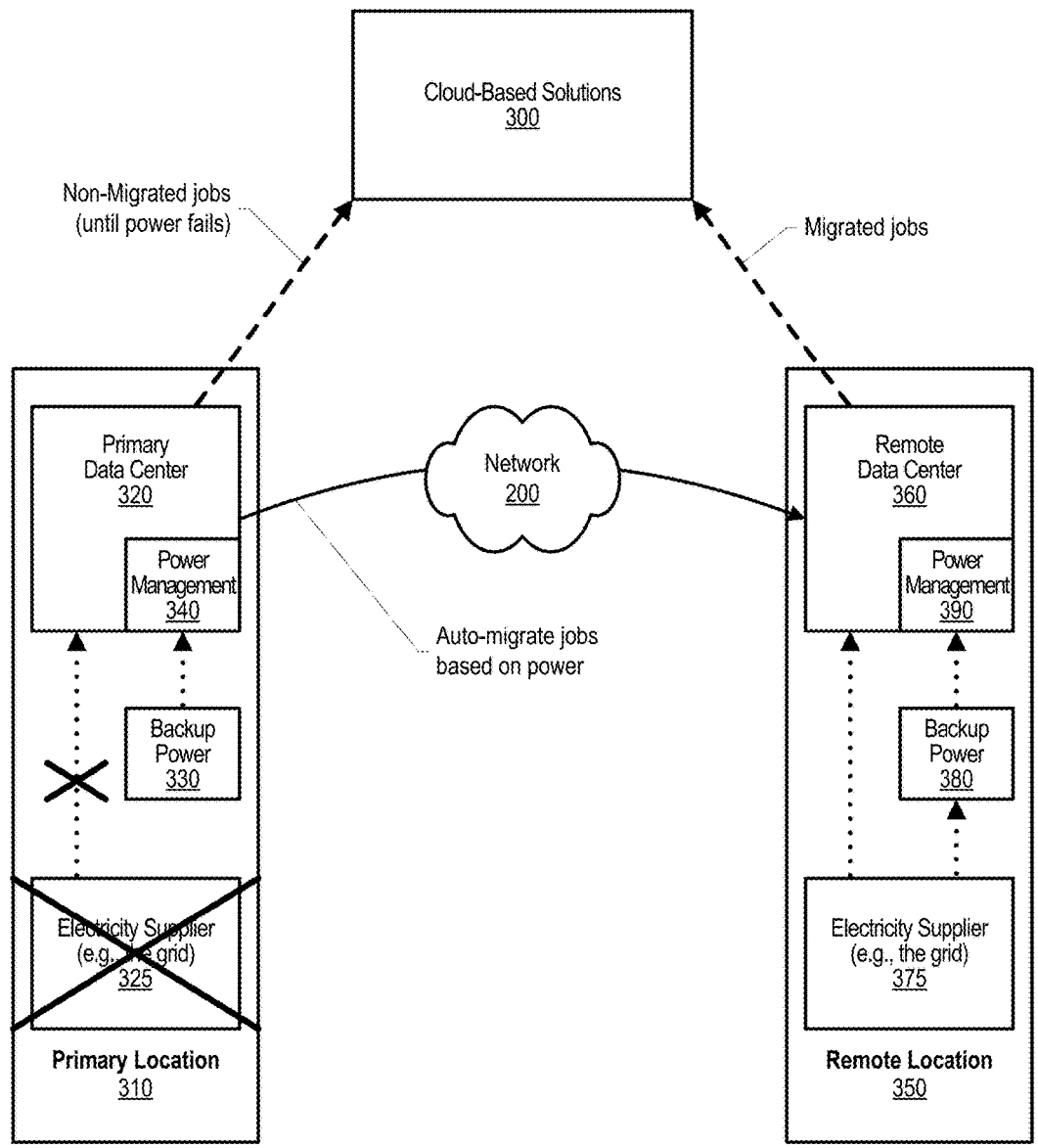
FIG. 3 is a component diagram depicting automatic job migration from a primary data center to a remote data center based on power availability.

FIG. 3 is a component diagram depicting automatic job migration from a primary data center to a remote data center based on power availability. Cloud-based solutions 300 include cloud-based applications that are running in the cloud and accessible by end users over computer network 200, such as the Internet. Customers of some cloud-based applications desire continuous access to the cloud-based solutions, even in the event of a power outage at primary data center 320 that is located at primary location 310.

In the example shown, an event, such as a natural disaster, has occurred that has resulted in an expected power outage at primary location 310 that will eventually cause a power outage at primary data center 320 if backup power sources 330 are depleted before primary electric power from supplier 325 is restored, such as by a local power company that provides electric power to primary location 310. When the event occurs, primary electric power from electricity supplier 325 is disrupted, causing primary data center 320 to switch to one or more backup power supplies 330, such as Uninterruptible Power Supplies (UPS) and backup power generators that run on fuel, such as oil or gasoline. Power management system 340 operating in primary data center 320 receives power related data from power systems, such as primary electricity supplier 325 and backup power systems 330. This power related data includes time estimates related to the amount of power available from each of the power systems. The power management system analyzes these sets of power related data to determine an anticipated power outage for the primary data center and a power outage time estimate that is an estimate of the time until power from the backup power systems is expected to be completed and a total power outage at primary data center 320 to occur.

Based on the power outage time estimate, power management system 340 identifies jobs that are currently running on primary data center that should be migrated to a remote data center, such as remote data center 360. Note that, in one embodiment, the decision to migrate jobs to a particular remote data center, is also based on power management system 390 at the remote data center reporting that the remote data center is operating and in light of any anticipated outage and any power outage time estimate determined for the remote data center by its power management system 390 based on the analysis of electricity supplier 375 that supplies electric power to remote location 350 where remote data center is operating as well as based on backup power systems 380 that provide backup power, such as UPS and power generators, at remote location 350 to remote data center 360. In a further embodiment, power availability on network paths between primary data center 320 and remote data center 360 over computer network 200 can also be taken into account by power management 340 to both determine which remote data center to use as the remote data center as well as determine the power outage time estimate. In this embodiment, the power outage time estimate is determined by considering not only the power systems available at primary location 310 but also the power systems available on network connections as well as power systems, such as primary electricity provider 375 and backup power systems 380 at remote location 380.

Figure 4:
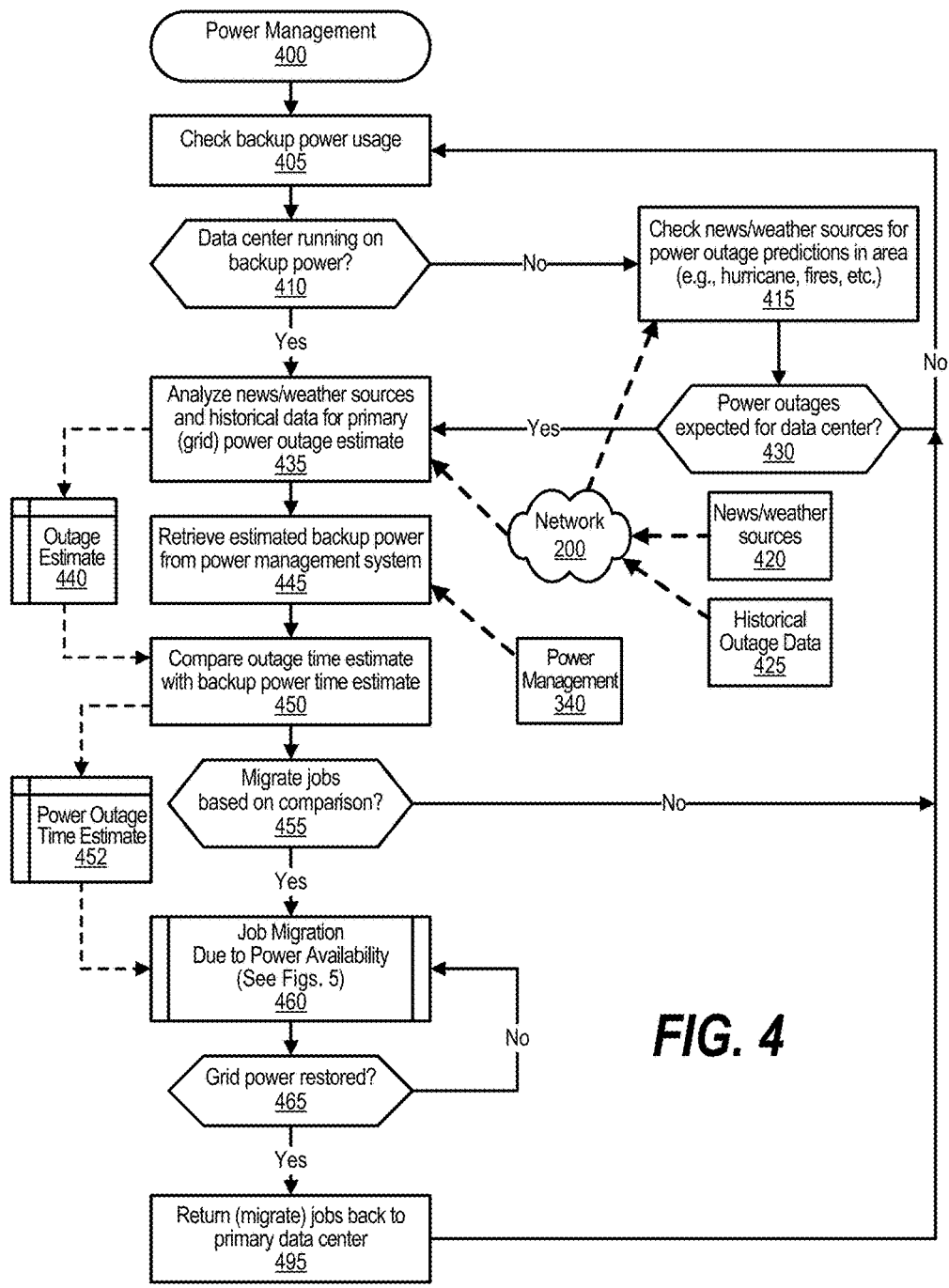
FIG. 4 is a flowchart depicting steps performed by a data center's power management process to determine whether to migrate jobs based on power availability.

FIG. 4 is a flowchart depicting steps performed by a data center's power management process to determine whether to migrate jobs based on power availability. Power management processing commences at 400 and shows the steps performed by the power manager operating on the primary data center. At step 405, the process checks to see if the primary data center is receiving electrical power from one or more backup power systems. A determination is made whether the primary data center is operating using power from one or more backup power systems (decision 410). If the primary data center is operating using power from one or more backup power systems, then decision 410 branches to the 'yes' branch whereupon processing performs steps to analyze the power outage situation.

On the other hand, if the primary data center is not running on backup power, then decision 410 branches to the 'no' branch whereupon, at step 415, the process checks and analyzes news and weather sources for any power outage predictions in the area of the primary data center, such as expected severe storms, floods, fires, and the like. News and weather sources 420 are accessed over computer network 200, such as the Internet, and are received from a variety of media outlets. A determination is made whether, based on the analysis performed at step 415, any power outages are expected for the primary data center (decision 430). If no power outages are anticipated, then decision 430 branches to the 'no' branch which loops back to step 405 to continue monitoring for possible power outages. On the other hand, if a power outage is anticipated for the primary data center, then decision 430 branches to the 'yes' branch to perform the steps to analyze the anticipated power outage situation.

At step 435, the process analyzes news and weather sources 420 via computer network 200 as well as historical power outage data 425 also retrieved over computer network 200 or, in some embodiments, retrieved from a local data store in case computer network access is disrupted. The analysis performed at step 435 results in an amount of time that primary (grid) power is anticipated to be disrupted to the primary data center. This outage estimate is stored in memory area 440. At step 445, the process retrieves the estimated time that the primary data center can run on backup power systems by receiving sets of power related data from one or more backup power systems that is made available through power management subsystem 340. The amount of time that the system can operate on backup power is referred to as the power outage time estimate, after which time backup power sources will be depleted resulting in a total power outage for the primary data center. At step 450, the amount of time that the primary (grid) power is anticipated to be disrupted (out) is compared to the power outage time estimate to see if there is enough backup power so that the primary data center can remain operational until the primary (grid) power is restored. The power outage time estimate is stored in memory area 452 and is the amount of time that the primary data center is anticipated to be able to operate using its backup power systems, such as UPS and backup generators.

A determination is made whether the primary data center needs to migrate jobs to a remote data center based on the comparison performed at step 450 (decision 455). If the power outage time estimate is shorter than the time at which primary (grid) power is expected to be returned, then decision 455 branches to the 'yes' branch whereupon, at predefined process 460, the process performs the Job Migration Due to Power Availability routine (see FIG. 5 and corresponding text for further details). The process continually checks to see if primary (grid) power has been restored to the primary data center (decision 465). While primary power remains off, decision 465 branches to the 'no' branch which loops back to predefined process 460 to continue migrating jobs to the remote data center. This looping continues until primary (grid) power is restored to the primary data center, at which point decision 465 branches to the 'yes' branch whereupon, at step 495, processing returns jobs back to the primary data center by migrating the jobs from the remote data center back to the primary data center. Processing then loops back to step 405 to continue monitoring for power outages.

Figure 5:
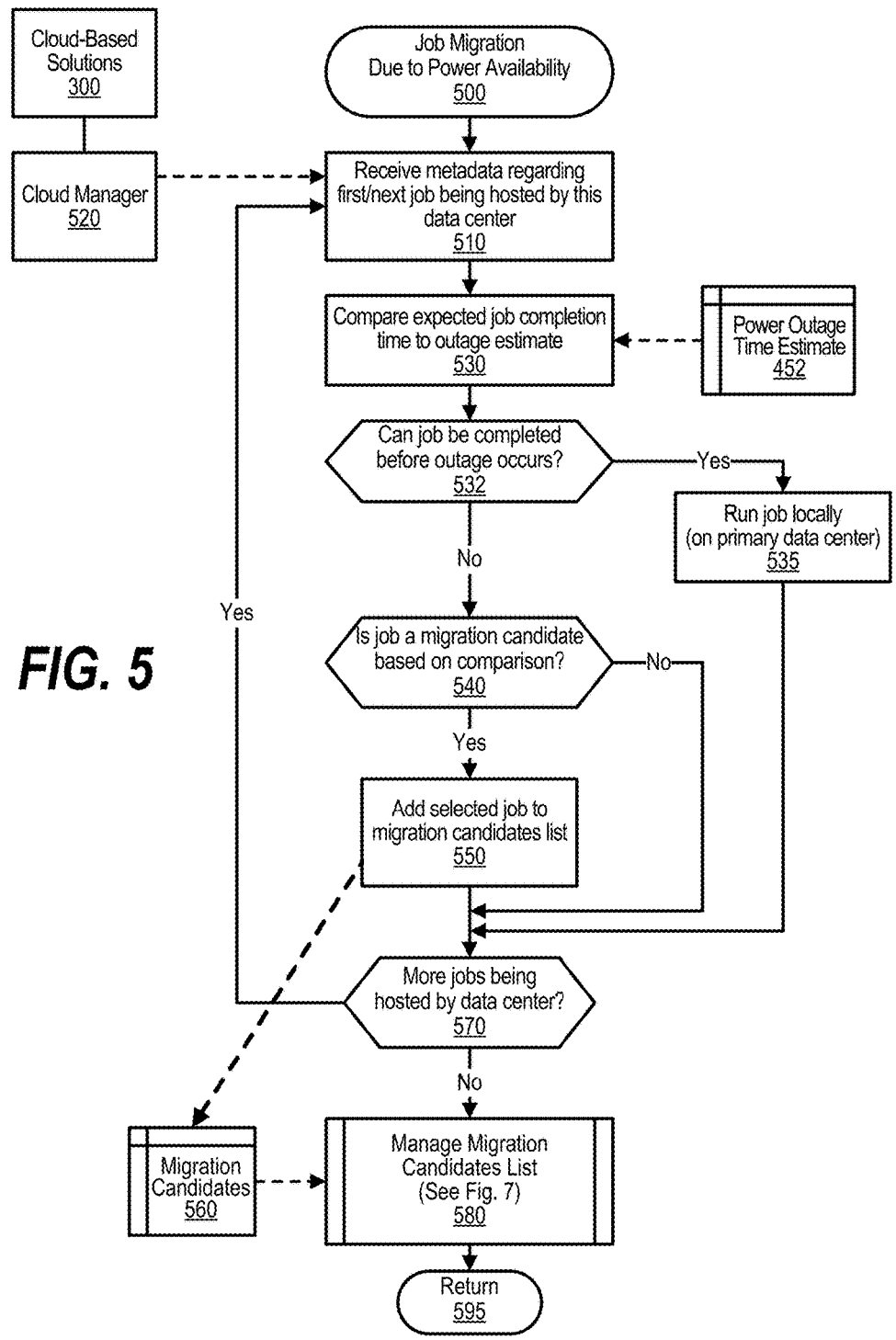
FIG. 5 is a flowchart depicting steps taken during job migration due to power availability.

FIG. 5 is a flowchart depicting steps taken during job migration due to power availability. This routine is called from the process shown in FIG. 4 and commences at 500 whereupon, at step 510, the process receives metadata pertaining to the first job that is being hosted by the primary data center. In one embodiment, the job metadata is received from cloud manager process 520 that manages cloud-based applications 300 that are running in the cloud.

At step 530, the process compares the expected job completion time of the selected job to the power outage time estimate that is retrieved from memory area 452. A determination is made whether the selected job can be completed before the power outage time estimate (decision 532). If the selected job can be completed before the power outage time estimate, then decision 532 branches to the 'yes' branch whereupon, at step 535, the process runs the job locally on the primary data center. On the other hand, if the job is anticipated to complete after backup power has been depleted (after the power outage time estimate), then decision 532 branches to the 'no' branch to perform steps 540 and 550.

A determination is made whether the selected job is a candidate to be migrated to the remote data center based in part on the comparison performed at step 530 as well as other factors that may be considered, such as whether the customer has contracted with the data center provider to have its jobs migrated to remote data center in the event of a power failure (decision 540). If the selected job is a candidate for migration, then decision 540 branches to the 'yes' branch whereupon, at step 550, the process adds the job to a migration candidates list that is stored in memory area 560. On the other hand, if the selected job is not a candidate for migration to the remote data center, then decision 540 branches to the 'no' branch bypassing step 550.

A determination is made whether there are more jobs being hosted by the primary data center that need to be selected and processed as described above (decision 570). If there are more jobs to be selected and processed, then decision 570 branches to the 'yes' branch which loops back to step 510 to select the next job that is being hosted by the primary data center and process the job as described above. This looping continues until all of the jobs have been selected and processed, at which point decision 570 branches to the 'no' branch exiting the loop.

Figure 7:
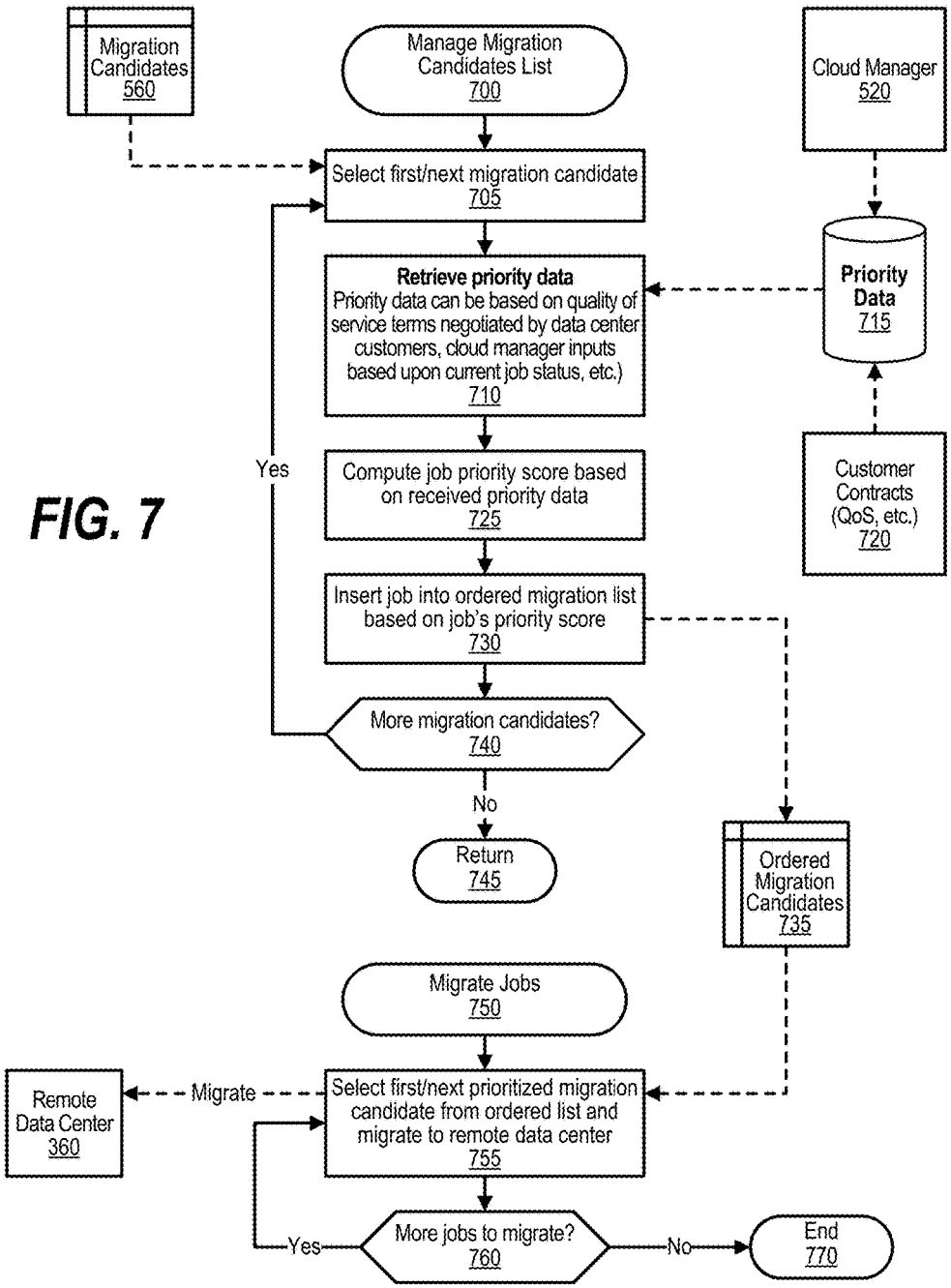
FIG. 7 is a flowchart depicting steps performed to manage a migration candidates list that prioritizes jobs that are migrated to a remote data center.

At predefined process 580, the process performs the Manage Migration Candidates List routine (see FIG. 7 and corresponding text for further details). Processing thereafter returns to the calling routine (see FIG. 4) at 595.

Figure 6:
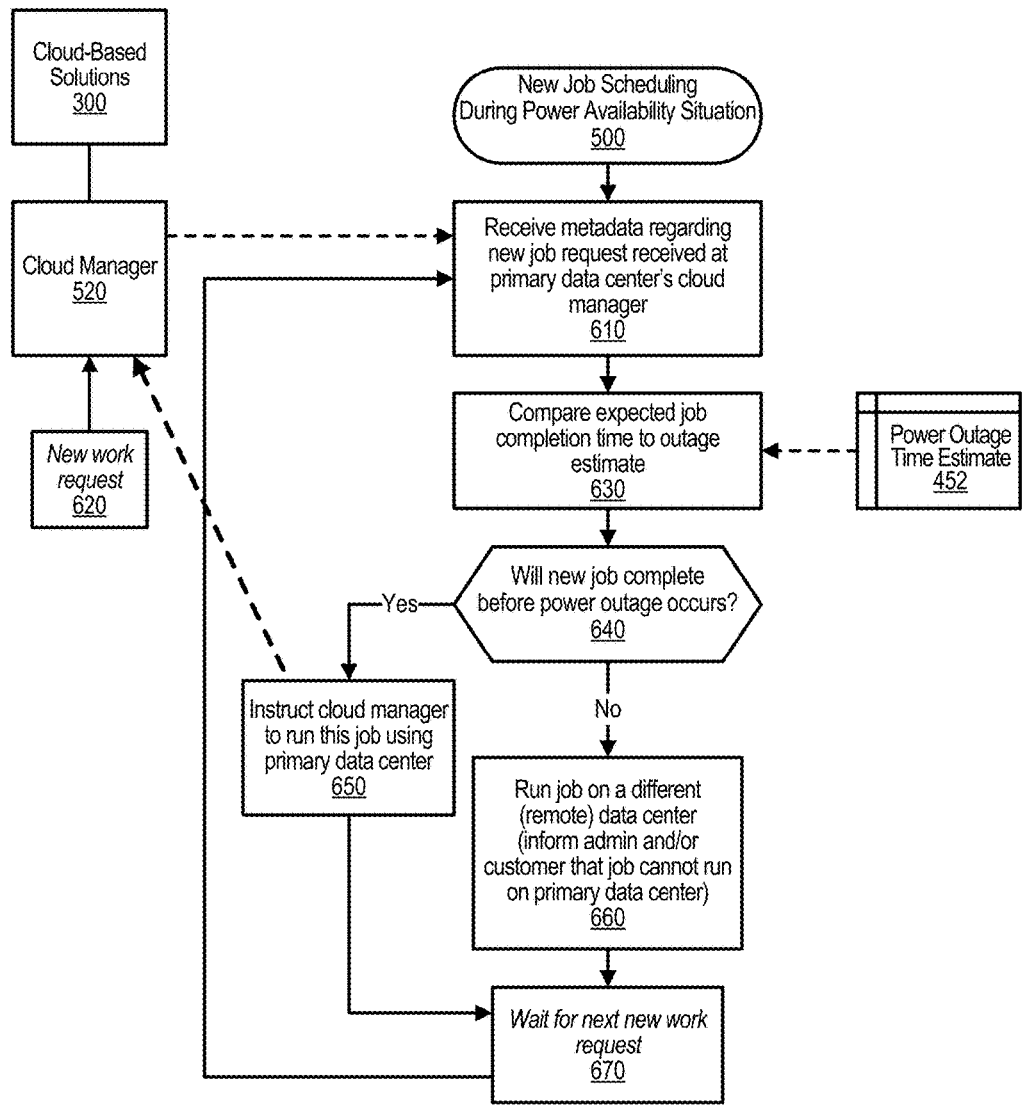
FIG. 6 is a flowchart depicting scheduling of new jobs that arrive prior to an expected power outage.

FIG. 6 is a flowchart depicting scheduling of new jobs that arrive prior to an expected power outage. This routine is performed when a new job arrives at the primary data center for execution. In one embodiment, new work request 620 is submitted to cloud manager 520 that manages the primary data center's jobs and the cloud based applications 300 being hosted by the primary data center. At step 610, the process receives metadata pertaining to the new job request that was received at the primary data center.

At step 630, the process compares the expected job completion time for the new job with the power outage time estimate that is retrieved from memory area 452. A determination is made based on the comparison as to whether the new job can be completed before the total power outage at the primary data center occurs rendering the primary data center inoperative (decision 640). If the job can complete in time, then decision 640 branches to the 'yes' branch whereupon, at step 650, the process instructs the cloud manager to run this new job at the primary data center. On the other hand, if the job is not expected to complete in time, then decision 640 branches to the 'no' branch whereupon, at step 660, the process can run job on a different (remote) data center or the process can inform the administrator and/or customer requesting the new job that the job cannot run on primary data center due to the impending power outage.

At step 670, the process waits for the next new work request to arrive. When a new work request arrives, then processing loops back to step 610 to receive metadata about the job and process the new job as described above.

FIG. 7 is a flowchart depicting steps performed to manage a migration candidates list that prioritizes jobs that are migrated to a remote data center. This routine is called by FIG. 6 and commences at 700 whereupon, at step 710, the process selects the first migration candidate from the list of migration candidates that have been stored in memory area 560. At step 710, the process retrieves priority data from data store 715. Priority data store 715 is managed by cloud manager 520 and includes data from customer contracts, such as quality-of-service (QoS) terms set forth in such customer contracts. Customers may opt to pay additional money for increased priority to better ensure that certain customers' jobs are continually operational by having such jobs migrate to the remote data center ahead of other jobs. In addition, the priority data can also be based on cloud manager inputs based upon current job status, such as whether the job is performing a critical section of code, etc.

At step 725, the process computes a job priority score that is based on the received priority data pertaining to the selected migration candidate (job). At step 730, the process inserts the selected job into the ordered migration candidates list that is stored in memory area 735 based on the computed priority of the selected job. A determination is made whether there are more migration candidates (jobs) to process (decision 740). If there are more migration candidates to process, then decision 740 branches to the 'yes' branch which loops back to step 705 to select and process the next migration candidate as described above resulting in the next migration candidate being inserted into ordered migration candidates list 735. This looping continues until there are no more migration candidates to process, at which point decision 740 branches to the 'no' branch and process returns to the calling routine (see FIG. 5) at 745.

The migrate jobs process commences at 750 and executes in parallel with the manage migration candidates list that commenced at 700. In the migrate jobs routine, at step 755, the process selects the first prioritized migration candidate (the candidate with the highest or best priority) from memory area 735 and migrates the job to remote data center 360 using traditional migration processes. A determination is made whether there are more jobs to migrate to the remote data center (decision 760). If there are more jobs to migrate, then decision 760 branches to the 'yes' branch which continues to loop back to step 755 to select and migrate the next job listed in memory area 735 to remote data center 360. This looping continues until there are no more jobs to migrate to the remote data center, at which point decision 760 branches to the 'no' branch and the migrate jobs routine ends at 770.

Some embodiments of the present invention may include one, or more, of the following features, characteristics, operations and/or advantages: (i) managing, by a first cloud controller, a first set of power system(s) that provide power to powered hardware components of a first cloud; (ii) receiving, by the first cloud controller and from a first power system of the first set of power system(s) a first item of power related information; (iii) determining, by the first cloud controller, a procedure for safely evacuating and/or shutting down the first power system based, at least in part, upon the first item of power related information; (iv) a disaster recovery application communicates with the power system(s) to influence what those power systems do; (v) when the backup power can be controlled to direct backup power to different power zones, the disaster recovery application can look at the shutdown time of each of the systems in each of the power zones and then determine, from the power system, how much more time that would give the remaining power zones; (vi) use historical information about the work being done when making the migration decision (for example, if historically the work will complete during the shutdown time, do not migrate it, or migrating to a less desirable target (another crashing cloud) because it will survive the time needed to migrate and complete the work; (vii) in the event that the datacenter has failed and is in recovery mode, machine logic determines what the risk of going ahead and using the system in recovery is based, at least in part, upon evaluates at the historic aspects of the work request (such as the time to complete); (viii) going ahead and using the power system in recovery, if: (a) proceeding in this manner has been approved by the requestor, and/or (b) meets certain pre-defined threshold(s) for proceeding to do the work on a failing system; and/or (ix) potentially especially useful in the realm of container clouds where they are quick to start up and are often used for short duration calculations.

Some embodiments of the present invention may include one, or more, of the following features, characteristics, operations and/or advantages: (i) build upon the basic idea of enabling a cloud controller to be able to leverage data from its power systems to make decisions about how to safely evacuate or shutdown the system; (ii) leverages the data that comes from its power systems to make a determination as to whether it is safer to snapshot VM's to save them based on how and where evacuation is progressing; (iii) expands options for recovery and/or considers, by machine logic, the entire migration path; (iv) because of the new option of snapshotting, some embodiments of the present invention may take a relatively global migratory view that includes options beyond the option of migration; (v) in some embodiments, the relatively global migratory view may manifests itself as the cloud controller working with other cloud controllers and other power systems to look at the availability/efficacy of the systems it is connected to for mitigation; (vi) when workloads are running in a cloud that is potentially going to go down, and there are VMs that need to be migrated to a target cloud that is not failing, quiescing the VM's that are to be moved to the new target cloud and transferring the data (memory, process state, etc.) to the target cloud in a manner that takes priority from a bandwidth viewpoint to avoid having the power drop out from under running VMs; (vii) in parallel some embodiments may include VMs that are not going to be able to be migrated to the target environment snapshotted, capturing and saving their state to disc in a manner that won't impact the migration of the live VMs; (viii) when determining what actions to take, rather than defaulting to either migrating via pure migration and shutting down, include the option to snapshot; (ix) exercising the snapshot option by estimating which of the VMs which were going to be migrated and shutdown would instead be snapshotted and the snapshot sent to the other system; (x) when exercising the snapshot option, considering, by machine logic, the historic time to snapshot VMs of the relevant type, the resulting size of the snapshot, and/or the available bandwidth to transmit the snapshot; (xi) considering, by machine logic of the cloud controller, whether the snapshots can be transmitted to an intermediate (transfer) node using paths which will use bandwidth not needed for the migration and then subsequently transferred to the target system for recovery; and/or (xii) ensuring, by the cloud controller, that all transfer nodes (because multiple could be used) are not being evacuated (for example, by communicating with the transfer node's cloud controller).

Some embodiments of the present invention may include one, or more, of the following features, characteristics, operations and/or advantages: (i) enabling a cloud controller to use the data collected from emergency power systems to make intelligent job scheduling decisions; (ii) adding the ability to notify users of a data-center's power status so they can make a decision about job scheduling; (iii) performs scheduling of new incoming jobs; (iv) when a new job is submitted to be scheduled, the default behavior will be to schedule the job to one of the other available nodes; (v) when all nodes are in evacuation mode some embodiments may add the ability to query the user to see if the request should be scheduled anyway; (vi) provide information about how long until power is removed (best and optimistic cases); (vii) if the user indicates to go ahead, the job would either be marked as migrated (or shutdown) last or to not be included at all; and/or (viii) this behavior can also be configured so that this is done automatically for certain requests or users (for example, if the cloud is scheduling container micro-services which are stateless or historically short lived containers).

Some embodiments of the present invention may include one, or more, of the following features, characteristics, operations and/or advantages: (i) a "cloud controller," as that term is used herein, is a set of machine logic (for example, software) that builds public, private and/or hybrid cloud computing environments and manages and controls pooling compute, storage, network resources and power systems in the cloud(s) that can be dynamically scaled up or down as application workloads change; (ii) typically, a cloud controller takes the form of a collection of compute components that represent the global state of the cloud and communicates with services, such as Identity authentication, Object Storage, and node/storage workers through a queue; and/or (iii) a "cloud controller node," as that term is used herein, is a node that runs network, volume, API, scheduler, image services and power systems; each service may be broken out into separate cloud controller nodes for scalability or availability.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
receiving one or more sets of real-time power related data corresponding to operation of one or more power systems;
applying, by a set of processor(s), a set of machine logic based rules to the sets of real-time power related data, to determine an anticipated power outage data set comprising an anticipated start time and an anticipated location of an anticipated power outage;
identifying a first computing job to be migrated from a first data center to a second data center, wherein the identification of the first computing job is based, at least in part, on the anticipated power outage data set; and
migrating the first computing job from the first data center to the second data center.

2. The method of claim 1 wherein the identification of the first computing job includes:
determining that an estimated completion time associated with the first computing job is subsequent to the anticipated start time.

3. The method of claim 1 wherein:
the first data center is a primary data center;
the second data center is a first remote data center of a plurality of remote data centers;
receiving a first set of power related data potentially relevant to operation of a first power system that supplies power to the primary data center; and
for each given remote data center of the plurality of remote data centers, receiving a set of power related data from a power system that supplies power to the given remote data center.

4. The method of claim 1 wherein:
the identification of the first computing job includes:
receiving a migration candidates list that identifies a plurality of computing jobs that are candidates for migration from the first data center to the second data center and includes information indicative of a priority value respectively associated with each computing job of the plurality of computing jobs, and
comparing the priority values respectively associated with each computing job of the plurality of computing jobs; and
the identification of the first computing job to be migrated from the first data center to the second data center is based, at least in part, on the comparison of the priority values.

5. The method of claim 1 wherein the first computing job is a cloud-based application accessible by end users over a computer network, the method further comprising:
wherein the migrating of the first computing job to the second data center is performed in a manner such that access to the cloud-based application is provided to the end users during the migration.

6. The method of claim 1 further comprising:
analyzing the sets of power related data, wherein the analysis further comprises:
retrieving a set of power outage metadata corresponding to the power outage;
receiving, over a computer network, a set of current event data from one or more media channels, wherein the current event data pertain to an event causing the power outage;
receiving a set of historical outage data based, at least in part, on the set of power outage metadata; and
analyzing the historical outage data and the current event data, wherein the anticipated power outage start time estimate is based, at least in part, on the analysis of the historical outage data and the current event data.

7. The method of claim 1 wherein the sets of power related data include at least one of the following types of power related data: weather information, seismic/volcanic information, war related information, terrorism related information, historical power consumption information, grid infrastructure related information, flood related information, labor strike related information, meteor/comet related information, economic information, political information, legal information, regulatory information, pollution related information and/or business information.

8. An information handling system (IHS) comprising:
one or more processors;
a network adapter that connects the information handling system to a computer network;
a memory coupled to at least one of the processors; and
a set of instructions stored in the memory and executable by the processor(s) to perform actions comprising:
receiving one or more sets of real-time power related data corresponding to operation of one or more power systems;
applying, by a set of processor(s), a set of machine logic based rules to the sets of real-time power related data, to determine an anticipated power outage data set comprising an anticipated start time and an anticipated location of an anticipated power outage;
identifying a first computing job to be migrated from a first data center to a second data center, wherein the identification of the first computing job is based, at least in part, on the anticipated power outage data set; and migrating the first computing job from the first data center to the second data center.

9. The IHS of claim 8 wherein the identification of the first computing job includes:
determining that an estimated completion time associated with the first computing job is subsequent to the anticipated start time.

10. The IHS of claim 8 wherein:
the first data center is a primary data center;
the second data center is a first remote data center of a plurality of remote data centers;
receiving a first set of power related data potentially relevant to operation of a first power system that supplies power to the primary data center; and
for each given remote data center of the plurality of remote data centers, receiving a set of power related data from a power system that supplies power to the given remote data center.

11. The IHS of claim 8 wherein:
the identification of the first computing job includes:
receiving a migration candidates list that identifies a plurality of computing jobs that are candidates for migration from the first data center to the second data center and includes information indicative of a priority value respectively associated with each computing job of the plurality of computing jobs, and
comparing the priority values respectively associated with each computing job of the plurality of computing jobs; and
the identification of the first computing job to be migrated from the first data center to the second data center is based, at least in part, on the comparison of the priority values.

12. The IHS of claim 8 wherein:
the first computing job is a cloud-based application accessible by end users over a computer network; and
wherein the migrating of the first computing job to the second data center is performed in a manner such that access to the cloud-based application is provided to the end users during the migration.

13. The IHS of claim 8 wherein the set of instructions stored in the memory is further executable by the processor(s) to perform the following action:
analyzing the sets of power related data, wherein the analysis further comprises:
retrieving a set of power outage metadata corresponding to the power outage;
receiving, over a computer network, a set of current event data from one or more media channels, wherein the current event data pertain to an event causing the power outage;
receiving a set of historical outage data based, at least in part, on the set of power outage metadata; and
analyzing the historical outage data and the current event data, wherein the anticipated power outage start time estimate is based, at least in part, on the analysis of the historical outage data and the current event data.

14. The IHS of claim 8 wherein the sets of power related data include at least one of the following types of power related data: weather information, seismic/volcanic information, war related information, terrorism related information, historical power consumption information, grid infrastructure related information, flood related information, labor strike related information, meteor/comet related information, economic information, political information, legal information, regulatory information, pollution related information and/or business information.

15. A computer program product (CPP) comprising:
a storage device for storing computer code; and
a set of instructions stored in the storage device and executable by a set of processor(s) to perform actions comprising:
receiving one or more sets of real-time power related data corresponding to operation of one or more power systems;
applying, by a set of processor(s), a set of machine logic based rules to the sets of real-time power related data, to determine an anticipated power outage data set comprising an anticipated start time and an anticipated location of an anticipated power outage;
identifying a first computing job to be migrated from a first data center to a second data center, wherein the identification of the first computing job is based, at least in part, on the anticipated power outage data set; and
migrating the first computing job from the first data center to the second data center.

16. The CPP of claim 15 wherein the identification of the first computing job includes:
determining that an estimated completion time associated with the first computing job is subsequent to the anticipated start time.

17. The CPP of claim 15 wherein:
the first data center is a primary data center;
the second data center is a first remote data center of a plurality of remote data centers;
receiving a first set of power related data potentially relevant to operation of a first power system that supplies power to the primary data center; and
for each given remote data center of the plurality of remote data centers, receiving a set of power related data from a power system that supplies power to the given remote data center.

18. The CPP of claim 15 wherein:
the identification of the first computing job includes:
receiving a migration candidates list that identifies a plurality of computing jobs that are candidates for migration from the first data center to the second data center and includes information indicative of a priority value respectively associated with each computing job of the plurality of computing jobs, and
comparing the priority values respectively associated with each computing job of the plurality of computing jobs; and
the identification of the first computing job to be migrated from the first data center to the second data center is based, at least in part, on the comparison of the priority values.

19. The CPP of claim 15 wherein:
the first computing job is a cloud-based application accessible by end users over a computer network; and
wherein the migrating of the first computing job to the second data center is performed in a manner such that access to the cloud-based application is provided to the end users during the migration.

20. The CPP of claim 15 wherein the set of instructions stored in the memory is further executable by the processor(s) to perform the following action:
analyzing the sets of power related data, wherein the analysis further comprises:

retrieving a set of power outage metadata corresponding to the power outage;

receiving, over a computer network, a set of current event data from one or more media channels, wherein the current event data pertain to an event causing the power outage;

receiving a set of historical outage data based, at least in part, on the set of power outage metadata; and analyzing the historical outage data and the current event data, wherein the anticipated power outage start time estimate is based, at least in part, on the analysis of the historical outage data and the current event data.

* * * * *